(12) United States Patent
Bhargava et al.

(10) Patent No.: US 11,213,980 B2
(45) Date of Patent: *Jan. 4, 2022

(54) METHOD OF MOLDING FOAM ARTICLES

(71) Applicant: Lifoam Industries, LLC, Greer, SC (US)

(72) Inventors: Saumitra Bhargava, Clarksville, MD (US); Jonathan Dean Godfrey, Bel Air, MD (US); James H. Brakebill, Destin, FL (US)

(73) Assignee: LIFOAM INDUSTRIES, LLC, Greer, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,686

(22) Filed: Jun. 22, 2020

(65) Prior Publication Data

US 2020/0316827 A1 Oct. 8, 2020

Related U.S. Application Data

(63) Continuation of application No. 15/529,454, filed as application No. PCT/US2015/022882 on Mar. 27, 2015, now Pat. No. 10,688,698.

(60) Provisional application No. 62/084,839, filed on Nov. 26, 2014.

(51) Int. Cl.
*B29C 44/34* (2006.01)
*B29C 67/20* (2006.01)
*B29C 44/44* (2006.01)
*C08J 9/18* (2006.01)
(Continued)

(52) U.S. Cl.
CPC ...... *B29C 44/3415* (2013.01); *B29C 44/3403* (2013.01); *B29C 44/445* (2013.01); *B29C 67/205* (2013.01); *C08J 9/18* (2013.01); *B29K 2025/06* (2013.01); *B29K 2067/046* (2013.01)

(58) Field of Classification Search
CPC ............ B29C 44/3461; B29C 44/3465; B29C 44/3492; B29C 44/3496; B29C 43/56; B29C 2043/561; B29C 44/3403; B29C 44/3415; B29C 44/3426; B29C 44/445; B29C 67/205; B29C 33/18
See application file for complete search history.

(56) References Cited

U.S. PATENT DOCUMENTS 3,278,658 A 10/1966 Immel
4,032,609 A 6/1977 Smith
4,722,944 A 2/1988 Mori et al.
(Continued)

OTHER PUBLICATIONS

International Search Report and Written Opinion for International Application No. PCT/US2015/022882 dated Jun. 19, 2015 (8 pages).

*Primary Examiner* — Stella K Yi
(74) *Attorney, Agent, or Firm* — Eversheds Sutherland (US) LLP

(57) ABSTRACT

A method of making molded foam articles and the articles produced. A molded foam article is produced by heating or preheating the mold to a temperature at or above the glass transition or melt temperature of the particles to be molded. Foamed particles are then introduced into the mold. The particle filled mold is then subjected to a vacuum to stabilize the molded article, without application of any additional heating or cooling. The molded article is then removed from the mold at a temperature at or below the glass transition temperature of the particles, and the cycle repeated to form multiple molded articles.

16 Claims, 3 Drawing Sheets

(51) Int. Cl.
   *B29K 25/00*      (2006.01)
   *B29K 67/00*      (2006.01)

(56)            References Cited

U.S. PATENT DOCUMENTS

| | | |
|---|---|---|
| 6,358,459 B1 | 3/2002 | Ziegler et al. |
| 7,872,056 B2 | 1/2011 | Cheung et al. |
| 2003/0006519 A1 | 1/2003 | Kopp |
| 2005/0059747 A1 | 3/2005 | Berghmans et al. |
| 2006/0058406 A1 | 3/2006 | Matsumura et al. |
| 2010/0029793 A1 | 2/2010 | Witt et al. |
| 2010/0222442 A1 | 9/2010 | Prissok et al. |
| 2013/0059938 A1 | 3/2013 | Paetz-Lauter et al. |
| 2013/0116352 A1 | 5/2013 | Jo et al. |

METHOD OF MOLDING FOAM ARTICLES

CROSS-REFERENCE TO RELATED APPLICATIONS

The instant application is a continuation of U.S. patent application Ser. No. 15/529,454, filed May 24, 2017, which is a U.S. national stage application claiming priority to International Application No. PCT/US2015/022882, filed Mar. 27, 2015, which is an International Application claiming priority to U.S. Provisional Application No. 62/084,839, filed Nov. 26, 2014, the disclosures of which are hereby expressly incorporated by reference herein in their entirety.

TECHNICAL FIELD

The field of art to which this invention generally pertains is methods for making particle foam containing articles.

BACKGROUND

There are many processes that can be used and have been used over the years to produce foamed articles. While foamed articles have many advantages over their non-foam counterparts, such as using less material, lighter weight to transport, etc., they still use a significant amount of energy to produce, and can raise environmental concerns for a variety of reasons.

The systems described herein are meant to address some of these challenges, including more efficient and effective manufacturing processes.

BRIEF SUMMARY

A method of making a molded foam article is described, including introducing foam particles into a mold, where the temperature of the mold is heated to a temperature above the glass transition temperature or melt temperature of the particles before, during or after the particles are introduced into the mold, subjecting the particle filled mold to a vacuum to fuse and stabilize the molded particles while cooling the mold to a temperature below the melt temperature of the particles or up to 15° C. above the glass transition temperature of the particles, and removing the molded foam article from the mold.

Additional embodiments include: the method described above where the mold is pre-heated before the particles are introduced into the mold; the method described above where the mold is heated as particles are being introduced into the mold; the method described above where the mold is heated to a temperature up to about 25° C. above the glass transition temperature or melt temperature of the particles but below the temperature at which the particles collapse; the method described above where the mold is heated to a temperature up to about 15° C. above the glass transition temperature or melt temperature of the particles; the method described above where the mold is heated to a temperature up to about 10° C. above the glass transition temperature or melt temperature of the particles; the method described above where the foam particles have a glass transition or melt temperature between about 50° C. and about 95° C.; the method described above where the foam particles comprise homopolymers, graft polymers, or copolymers of polylactic acid, polystyrene, polyethylene terephthalate, thermoplastic polyurethane, polyvinyl chloride, starch, poly(ethylene vinyl acetate), polyhydroxybutyrate, polyhydroxyalkanoate, or mixture thereof; the method described above where the foam particles comprise polyethylene and/or polypropylene copolymers; the method described above where the foam particles comprise graft polymers of polyethylene and/or polypropylene; the method described above where the foam particles comprise polyvinyl chloride; the method described above where the foam particles comprise virgin and/or recycled polyethylene terephthalate; the method described above where the foam particles comprise thermoplastic polyurethane; the method described above where the foam particles comprise, in whole or in part, hydrophilic polymer material; the method described above where the foam particles comprise starch, modified starch, polyacrylic acid, polyacrylic acid copolymers, polyglycolic acid, and mixtures thereof; the method described above where the mold is heated with steam, thermal fluids, electrical or induction heating; the method described above where the molded article produced is protective packaging, an insulated shipping container or foam cooler; the method described above where the article produced has sound attenuation, shock attenuation and/or thermal insulation properties; the method described above where the foam particles are introduced into the mold with heated air. Molded articles produced by the process described above are also described, including where the particles comprise polyvinyl chloride, polyethylene terephthalate, polyhydroxybutyrate, or polyhydroxyalkanoate.

These, and additional embodiments, will be apparent from the following descriptions.

DETAILED DESCRIPTION

Figure 1:
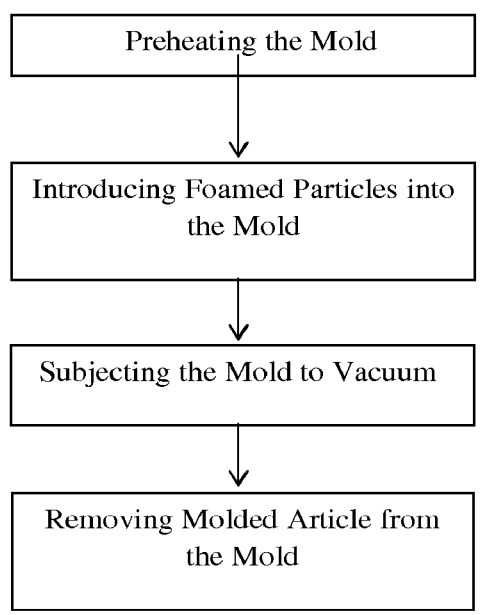
FIG. 1 shows one flow chart embodiment of a process described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

The foam particles used herein can include those formed, for example, as described in commonly owned US Published Patent Application No. 2012/0007267, the disclosure of which is herein incorporated by reference. The already-formed and pressurized or treated foam particles are blown into the mold, typically with the help of air. While chemical blowing agents can be included in the particles, this option is not preferred. Once in the mold, foam particle expansion causes pressure to increase in the mold. Some of the pre-pressurized gasses do come out of the foam particles as they heat up. Typically, a separate chamber is used to pressurize the foam particles before putting them in the mold. These are generally large tanks which hold the pressurized foam particles for typically for about 8 to about 24 hours. They are typically introduced into the mold right after pressurization. Oxygen or nitrogen are common pressurization gasses used. The use of heated air to transport the particles into the mold can also help to reduce cycle time as described herein.

With many particle foam processes, a substantial amount of energy is required to heat up and cool down the molds. With the processes described herein, existing particle foam molding machines can be used and the processes modified as described herein to shorten processing time and optimize energy savings. For example, as shown in FIG. 1, a typical process as described herein, includes preheating the mold to a temperature typically just above the melt temperature or about 20° C. to about 30° C. above the glass transition temperature of the foam particle, introducing the foam particles into the mold, applying a vacuum to fuse and stabilize the foam particles, and removing the molded article from the mold. Without the typical (e.g., steam) heating up, and cooling down used in particle foam molding processes, not only is significant energy saved, but cycle time for molding multiple parts is reduced significantly as well.

For example, in a typical process for molding each part with expanded polypropylene (EPP) particles the process includes a 100° C. or more increase in a temperature heating cycle in the mold, followed by the same decrease in temperature in a cooling cycle, with a heating-cooling cycle time of 3.5 minutes or more. With the process described herein, by preheating the mold to a temperature just above 165° C. (EPP melt temperature (Tm), for example), introducing the EPP particles into the mold, and applying a vacuum to fuse and stabilize the particles and bring the temperature back down to just below the Tm of the EPP prior to de-molding, not only is less energy required to cycle though each individual part molding, but significant cycle time savings can be realized in the part molding cycle as well, e.g., from 4 minutes down to 1.5 minutes.

Figure 2:
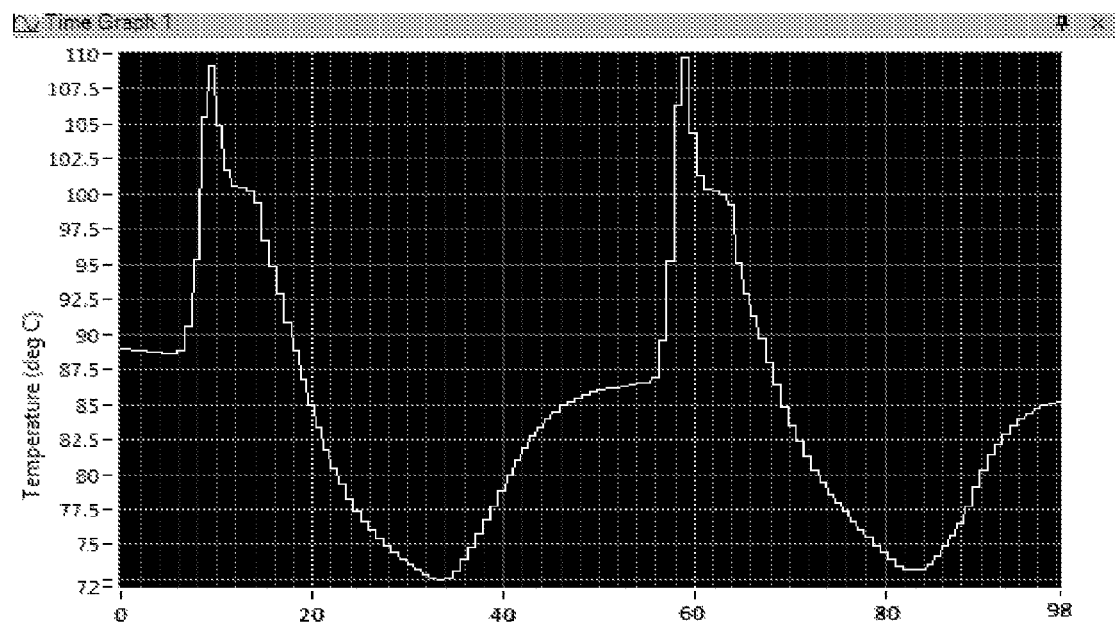
FIG. 2 shows a typical mold temperature process curve for molding expanded polystyrene (EPS).

Similarly, as shown in FIG. 2, in a typical process for molding each part with expanded polystyrene (EPS) particles the process includes a 30° C. or more increase in a temperature heating cycle in the mold, followed by the same decrease in temperature in a cooling cycle, with a heating-cooling cycle time of 35 seconds or more. Part temperatures are shown in an EPS molding process vs. time in seconds. Note that the temperature varies from 72° C. to 110° C. in each cycle—a 38° C. change. With the process described herein, by preheating the mold to a temperature just above 100° C. (EPS glass transition temperature (Tg), for example), introducing the EPS particles into the mold, and applying a vacuum to fuse and stabilize the particles and bring the temperature back down to near the Tg of the EPS prior to de-molding, again not only is less energy required to cycle though the part molding, but significant cycle time savings can be realized in the part molding cycle as well, e.g., from 45 seconds down to 22 seconds.

It should be noted that while the use of steam in direct contact with the polymer particles with conventional particle molding processes does have certain disadvantages as described herein, it does allow foam parts to be made in extremely large sizes, for example, blocks as large as 2 feet by 2 feet, or greater, because of the passing of the steam through the particles. With the process described herein, no steam (or any other heating medium) is being passed through the particles, but the heat for expanding and fusing the particles is provided by the heat contained or supplied to the mold to heat any liquids present, vaporize any water present, etc., and expand these particles. As a result, typically wall thicknesses of about 3 inches or less represent the reasonable, practical limit of making quality foamed articles as described herein.

As mentioned herein, fusion of the particles is primarily caused by using vacuum. But that being said, the temperatures described herein heat the air, carbon dioxide, nitrogen, pentane, etc. to help the particles to expand. Conventional molding processes rely on contact with steam to cause fusion to occur, e.g. in a typical EPS molding process. In the processes described herein, the vapor pressure from the water and/or pentane, etc., within the EPS for example, along with the temperature of particles being raised above the glass transition temperature along with the vacuum allows the particles to expand and fuse.

Figure 3:
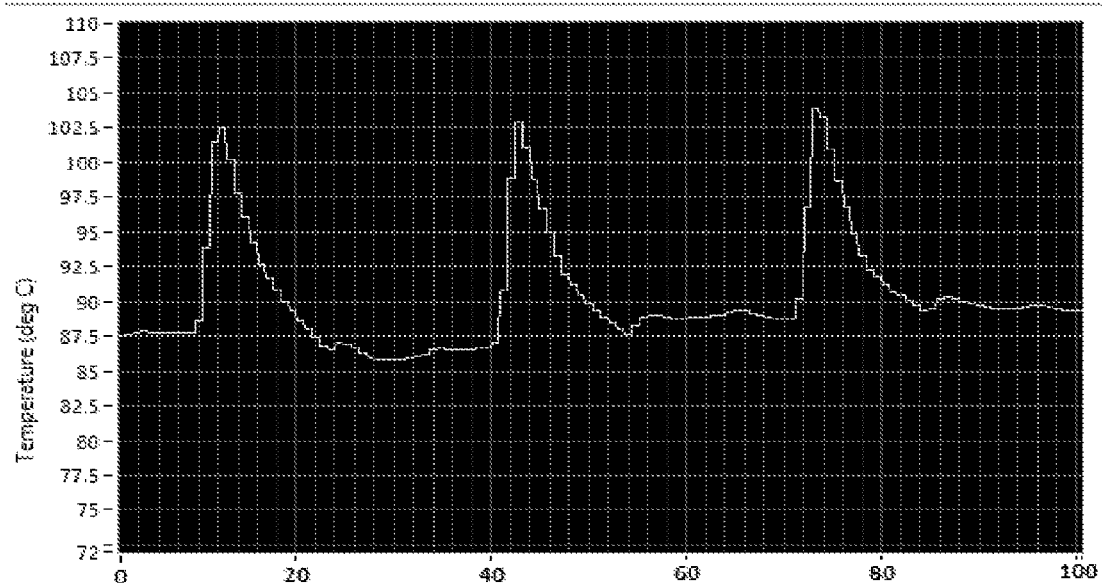
FIG. 3 shows a typical mold temperature process curve for molding expanded polylactic acid as described herein (EPLA).

As shown in FIG. 3, when molding expanded polylactic acid (EPLA) particles, with 15° C. temperature swing, and a 25 second cycle time, each EPLA part can be molded. Part temperature is shown in an EPLA molding process vs. time in seconds. Note that the temperature varies from 86° C. to 104° C. in each cycle—an 18° C. change. Thus, heating and cooling cycle times can be reduced significantly to produce a single molded article, e.g., 10% to 50% or more, depending on the polymer. For example, see the tables below.

The benefits described herein, are particularly useful with polymers such as homopolymers, graft polymers, or copolymers of polylactic acid, polystyrene, and polyethylene terephthalate (recycled as well as virgin), as well as particles which have been difficult to mold in the past such as thermoplastic polyurethane, and flame resistant polymers such as polyvinyl chloride. For example, the process described herein can process expanded polyvinyl chloride (EPVC) particles at temperatures just slightly above its Tg of 80° C., without the traditional steam heating at temperatures above 100° C. and with as little as a 10° C. heating cycle or less in a matter of seconds, clearly representing significant time and energy savings. In addition to EPLA, the process is use with other biopolymers, such as polyhydroxybutyrate, or polyhydroxyalkanoate, for example, including mixtures of various biopolymers with other biopolymers and/or non-biopolymers as well; and starch materials, for example, with melt temperatures of about 50° C. to about 95° C.

As mentioned above, with conventional particle molding processes, steam is used as the heating medium to expand the particles, and in fact typically passes right through the EPP and EPS particles, for example, to mold the particles. Because of this, these conventional particle molding processes cannot be used to mold hydrophilic materials because the foam structure within particle will collapse leading to loss in mechanical properties. So currently particle molding processes are generally limited to hydrophobic materials only. However, because steam does not contact the particle material in the processes described herein, the method described herein allows for the molding of hydrophilic polymer materials, either as a part of the makeup of the particle, or the entire particle itself. Thus, as mentioned above, particles made or containing in whole or in part commercially available hydrophilic, biopolymer materials such as starch, modified starch, polyacrylic acid, polyacrylic acid copolymers, polyglycolic acid, etc., and mixtures thereof, can be readily molded with the processes described herein. These materials can also be added to other polymer materials, for example hydrophobic polymer materials such as those described herein, and molded as described herein as well, which cannot typically be done with a conventional steam particle molding method.

The density of the part can also be controlled for different purposes, for example, ranging from 0.010 gm/cc (grams/cubic centimeter) density on the low end, to 0.07 gm/cc for most molded products, depending on the polymer used. The molded products described herein are typically about 0.015 to 0.035 gm/cc when using EPS or EPLA, for example. Also, typically insulation properties can be improved at lower densities, and cushioning properties can also be improved with lower densities.

The pre-heated mold is filled with treated or pressurized particles. The mold temperature and the mold is either only pre-heated before the particles are added to the mold, or pre-heated and post-heated after the particles are added, or heat is applied before, during and after the filling. The mold temperature typically rises up to about 30° C. above the glass transition temperature or just slightly above the melt temperature. A vacuum is then applied to fuse and stabilize the particles in the molded article. Vacuum results in evaporative cooling and cools the articles prior to de-molding. Steam is generally the cheapest way to heat up the molds, and is typically used in most conventional particle foam molding machines, although other heating means can also be used as described herein.

One of the benefits of the processes described herein is that EPLA can be successfully molded on conventional molding machines, but using less energy, and with faster processing cycle times. Because of the reduction and/or elimination of typical heating and cooling cycles, existing machines can be operated much faster—in some cases up to 55% faster, or even more—significantly reducing part production costs, in addition to generating energy savings up to 75%, or even more. In addition, the process can allow production of new molded polymer foam products which don't generally exist in the marketplace.

Because of the conventional steam heating and water cooling of molds, the foam particles typically end up wet, which is particularly undesirable for EPLA particle foam molded products. By eliminating or significantly reducing the steam heating while the foam particles are in the mold, the water cooling step can be eliminated. By applying minimal heat, and applying it prior to, during, or just after placing the foam particles in the mold, applying the vacuum provides fusion and stabilization of molded foam particle articles. For example with EPLA, the mold is pre-heated (which can be with steam but before any particles are introduced into the mold, and therefore, not touched by the steam) to heat the mold up to about 90° C., the mold is filled with the treated/pressurized particles, and a vacuum is applied on the mold which cools down the mold/part to about 80° C.

With conventional EPS particle molding systems, the molds containing the foam particles must be typically heated to over 110° C., then cooled back down to 75° C. The processes described herein typically have at most a 20° C. temperature swing by comparison. This obviously represents a significant savings in time and energy, among other things. The mold is simply heated (e.g., to approximately 95° C.) slightly above the glass transition temperature (Tg) in case of EPLA, or mold temperature of the foam particles (typically around 80° C.) to get the foam particles to expand and fuse. See the Table below. Thus the cycle time as defined by start-of-filling-of-the-mold to filling-of-the-mold-for-subsequent-part is reduced.

The length of time to mold will depend on such things as the moisture content, pretreatment of the foam particles, and degree of crystallinity. For particle foam of ethylene-polypropylene copolymer (such as conventional ethylene propylene diene monomer (EPDM) rubber materials), for example, with a mold temperature of about 70° C. to about 80° C., mold times may take a bit longer as melting requires more energy. Expanded polyethylene terephthalate (EPET) with a Tg of 70° C. can be processed into molded parts with the process described herein at approximately 85° C. Similarly EPVC with a Tg of 80° C. can be processed into molded parts with the process described herein at approximately 98° C. Eliminating the need for the additional heating and cooling steps normally encountered with particle foam molding provides significant time and energy savings, and cycle time reduction as described herein.

While steam heating is the heating system typically used in these types of molding processes, with the process described herein, other sources of heating can also be effectively used as well, for example, conventional thermal fluids (e.g., hot oils such as mineral oil, conventional hot glycol and water-glycol systems) and conventional electrical heating systems, such as induction heating (e.g., AMBRELL systems) can also be used. Needing just small, e.g., about 5°

C. to about 15° C., temperature swing with the process described herein, can open up the availability of otherwise expensive heating sources which would not otherwise usually be considered. Alternatively, resistive electrical heating can be applied for rapid heating.

Another example is the use of rapid application of vacuum with the process described herein. The vacuum system on conventional EPS molding machines is typically modified to achieve vacuum below −0.80 bar within 1 minute. Four steps to practice the process disclosed herein are shown in the FIG. 1. Additional steps can include such things as holding pressure using a pressure indicator, holding temperature, etc. Some conventionally used machines use approximations, e.g., based on trial and error, to control conditions, but the use of conventional pressure and temperature measuring devices can of course be used as well. The last step is to eject, or de-mold, the part. The process described herein reduces the time associated with two steps, e.g., heating and cooling with no change in vacuum times.

In addition, with the process described herein, other materials can be commercialized, such as some of those shown in the tables, which have been, at the very least, difficult to reasonably commercialize in the past. In fact, all recipes, including such things as EPLA or EPVC particle foam, can be molded using conventional particle foam molding machines, which typically can attain a minimum mold temperature of at least 110° C. See the tables below. Making these articles on existing particle foam molding machines can attain the energy savings and cycle time reduction by simply modifying the processes used on these machines.

While not required, the inclusion of such things as low melt polymers, stearates, wax, lubricants, rosins, etc. can assist the polymers to flow and can help facilitate the bonding of the particles.

The mold is typically filled with the particles, after the mold is pre-heated, although heat can be applied right after the mold is filled with the polymer particles or during filling of the particles. The use of the vacuum as described herein, removes moisture, and expands particles to fill the entire volume of mold cavity. Applying the vacuum helps keep the particles inflated until they fuse and stabilize, otherwise the part could suffer significant shrinkage. The part is then removed from the mold. The part is typically still hot when it comes out of mold, e.g., for EPLA, at around 80° C., but cools off rapidly when de-molded.

The preheating (or heating) of the mold is used to attain temperatures at Tg to up to about 5° C., 10° C., 15° C., 20° C., 25° C., 30° C., or more above the foam polymer particle Tg, or at Tm to about 1° C., 2° C., 3° C., 4° C., 5° C. or more above the Tm, depending on the material, as long as the temperature is not raised to a temperature at which the foam particles collapse. By reducing or eliminating the typically significant heating step after the material enters the mold, there is also no need for the significant separate cooling step typically used. When applying vacuum, evaporation of water in the molded parts results in evaporative cooling, (which gets the foam particles to a temperature near Tg or Tm, and the particle foam material will stop moving, i.e., gets particles to a temperature where they are stabilized, e.g., just below Tm or at Tg+/−10 or 15° C.) and fuse or bond, and the part doesn't deform (de-stabilize). And as stated above, not only does this represent significant energy and time savings using conventional machines (e.g. currently used EPS machines), but also allows materials to be economically processed that were not practical to commercialize in the past. The part is typically de-molded at or just below the Tg or Tm.

Sufficient heat is supplied to the polymer to cause polymer interchain mobility. This causes the bonding or fusion between the individual foam particles.

The foam particles used with the process described herein can be any polymer foam particles typically used for molding, e.g., EPVC, EPS, EPE and EPP copolymers, EPLA, etc. with or without additives. The process described herein can also be used to form ETPU (expanded thermoplastic polyurethane) articles, for example. These materials are used, for example, to form very light running shoes. Because of the time and energy savings recognized by the process described herein, the processing time to form such articles can be reduced by 50% or more, not to mention the savings in energy costs.

The foam particles useful in the methods described herein can be any foam polymer particles useful for forming molded foam articles. For example, the foam particles described in U.S. Patent Publication Nos. 2012/0007267 and 2012/0009420, the disclosures of which are herein incorporated by reference, can be used in the methods described herein.

TABLE 1

| Polymer | Tg °C. | Tm °C. | Peak Mold Temp °C. | Ejected Part Temp °C. | Mold Pressure Bar | Steam Duration Sec | Cycle Time Sec |
|---|---|---|---|---|---|---|---|
| EPS | 95-100 | | 105-115 | 85 | 0.8-1.1 | 7-15 | 50-70 |
| EPP | −20 | 165-173 | 165-170 | 70 | 2.5-4.5 | 20-50 | 90-240 |
| EPE | −75 | 130 | 0-10 | 80 | 0.8-1.4 | 10-20 | 60-75 |
| EPLA | 60-73 | 160 | 75-85 | 80 | 0.6-0.9 | 2-7 | 25-40 |
| EPET | 70 | 265 | 70-80* | | | | |
| EPVC | 80 | | 80-90* | | | | |
| ETPU | −10 to −40 | 70-130 | 140-180 | 55 | 4.0-6.0 | 40-80 | 150-300 |

*estimated

While any mold typically used for molding foam particles can be used with the processes described herein, conventional molds for molding EPS particles are particularly useful with the process. And while any articles typically molded with foam particles can be made, shipping containers and other protective packaging, coolers and other foam containers, etc. are particularly well suited for manufacture by the processes described herein. Typical applications, for example, are as an insulated shipping container, foam cooler or protective packaging. Articles with shock attenuation properties made as described herein are also particular useful.

Example 1

The Kurtz K-68 mold has a nominal 600 mm×800 mm platen area. The steam chests are sufficiently pre-heated to at least 100° C. before molding begins. The mold is constructed to conventional EPS mold building standards. The volume of the molded part is 454 cubic inches with a nominal wall thickness of 1.5 inches. 3.2 seconds of steam is applied to each side of the mold before the mold is filled with EPLA particles. 1.6-2.0 seconds of steam is applied to the particles while they are in the mold. No cooling water is applied and the particles are immediately subjected to vacuum. Within fifteen seconds, the pressure inside the mold is reduced to −0.70 Bar or less. The part is then de-molded and ejected.

Example 2

As an alternative example requiring no steaming after fill, EPLA particles are pre-treated before molding and the molding machine is sufficiently pre-heated to at least 100° C. before molding begins. Two seconds of steam is applied to each side of the mold before particles are transferred inside. The particles are transferred with air pressure into the mold. A short 0.2 second of purge is used to warm the mold and 1.2 seconds of steam is used on the particles while they are within the mold. No cooling water is applied and the particles are immediately subjected to vacuum. In fifteen seconds of vacuum time, the pressure inside the mold is reduced to −0.70 bar. After the part is stabilized, de-molded and eject the part.

TABLE 2

| Polymer | Low Temp ° C. | High Temp ° C. | Temp Differential ° C. | Foam Pressure Peak Bar | Steam Time Sec | Total Heating/ Cooling Time Sec |
|---|---|---|---|---|---|---|
| EPS | 85 | 115 | 30 | 1.25 | 6.5 | 35.0 |
| EPLA (Old) | 70 | 100 | 30 | 0.75 | 8.0 | 25.0 |
| EPLA (New) | 80 | 95 | 15 | 1.05 | 2.5 | 12.5 |

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a molded foam article, comprising:
   providing foam particles that comprise a homopolymer, graft polymer, or copolymer of polylactic acid;
   pre-heating a mold to a first temperature;
   introducing the foam particles into the pre-heated mold;
   subjecting the particle filled mold to a negative pressure while cooling the mold to a second temperature that is within 20° C. of and below the first temperature, to mold a foam article, wherein no external steam or other heating medium is passed through the mold while the foam particles are being molded; and
   removing the molded foam article from the mold.

2. The method of claim 1, wherein the first temperature is above the glass transition temperature of the foam particles.

3. The method of claim 2, wherein the first temperature is up to about 30° C. above the glass transition temperature of the foam particles but below the temperature at which the foam particles collapse.

4. The method of claim 2, wherein the foam particles have a glass transition temperature between about 50° C. and about 95° C.

5. The method of claim 1, wherein the first temperature is up to about 104° C.

6. The method of claim 1, wherein the second temperature is up to about 86° C.

7. The method of claim 1, wherein the negative pressure is between −0.6 bar and −0.9 bar inside the mold.

8. The method of claim 1, wherein the mold is pre-heated with steam, thermal fluids, electrical or induction heating.

9. The method of claim 1, wherein the molded foam article is protective packaging, an insulated shipping container, or a foam cooler.

10. A molded foam article produced by the method of claim 1.

11. The method of claim 1, wherein the method is performed over a cycle time of about 25 to 40 seconds.

12. The method of claim 1, wherein the molded foam article has a density of from 0.010 g/cm$^3$ to 0.07 g/cm$^3$.

13. The method of claim 1, wherein the molded foam article has a density of from 0.015 g/cm$^3$ to 0.035 g/cm$^3$.

14. The method of claim 1, wherein the foam particles are pressurized prior to introducing the foam particles into the pre-heated mold.

15. The method of claim 1, wherein the second temperature is within 15° C. of and below the first temperature.

16. The method of claim 1, wherein the foam particles consist essentially of homopolymers of polylactic acid.

* * * * *